United States Patent

Sakakima (10) Patent No.: US 10,742,951 B2
(45) Date of Patent: Aug. 11, 2020

(54) IMAGE GENERATION APPARATUS AND METHOD OF GENERATING VIRTUAL VIEW-POINT IMAGE (71) Applicant: CANON KABUSHIKI KAISHA, Tokyo (JP)

(72) Inventor: Eito Sakakima, Kamikura (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/214,654

(22) Filed: Dec. 10, 2018

(65) Prior Publication Data
US 2019/0182469 A1 Jun. 13, 2019

(30) Foreign Application Priority Data

Dec. 13, 2017 (JP) ................. 2017-238921

(51) Int. Cl.
G06T 13/00 (2011.01)
H04N 13/117 (2018.01)
G06T 13/20 (2011.01)
G06T 15/20 (2011.01)
H04N 7/18 (2006.01)
H04N 13/243 (2018.01)
H04N 5/232 (2006.01)
H04N 5/265 (2006.01)
(Continued)

(52) U.S. Cl.
CPC ............ H04N 13/117 (2018.05); G06T 7/00 (2013.01); G06T 7/97 (2017.01); G06T 13/20 (2013.01); G06T 15/205 (2013.01); G06T 17/00 (2013.01); H04N 5/232 (2013.01); H04N 5/265 (2013.01); H04N 7/181 (2013.01); H04N 13/243 (2018.05)

(58) Field of Classification Search
None
See application file for complete search history.

(56) References Cited

U.S. PATENT DOCUMENTS 6,067,073 A * 5/2000 Rae-Smith ............ G06T 11/001
345/589
7,023,436 B2 * 4/2006 Segawa ................... G06F 3/011
345/420

(Continued)

FOREIGN PATENT DOCUMENTS

JP 2011228845 A 11/2011

Primary Examiner — Martin Mushambo
(74) Attorney, Agent, or Firm — Carter, DeLuca & Farrell LLP (57) ABSTRACT An image generation apparatus that is configured to generate a virtual viewpoint image comprises: an obtaining unit configured to obtain shape data indicating a three-dimensional shape of an object captured from a plurality of directions by a plurality of cameras; a selecting unit configured to select, based on a result of an evaluation on the shape data obtained by the obtaining unit, a method of determining a pixel value in the virtual viewpoint image from among a plurality of methods; and a generating unit configured to generate a virtual viewpoint image by the method of determining the pixel value selected by the selecting unit, wherein the virtual viewpoint image based on images obtained based on capturing by the plurality of cameras, the shape data obtained by the obtaining unit, and viewpoint information representing a virtual viewpoint.

20 Claims, 7 Drawing Sheets (51) Int. Cl.
    *G06T 7/00*          (2017.01)
    *G06T 17/00*        (2006.01)

(56) References Cited

U.S. PATENT DOCUMENTS

| | | | | |
|---|---|---|---|---|
| 8,516,402 | B1* | 8/2013 | Wang | G03F 1/70 |
| | | | | 716/52 |
| 2002/0149583 | A1* | 10/2002 | Segawa | G06F 3/011 |
| | | | | 345/420 |
| 2002/0177481 | A1* | 11/2002 | Kitsutaka | A63F 13/10 |
| | | | | 463/30 |
| 2007/0047941 | A1* | 3/2007 | Iwane | G03B 13/36 |
| | | | | 396/123 |
| 2007/0201724 | A1* | 8/2007 | Steinberg | G06K 9/00228 |
| | | | | 382/103 |
| 2008/0192043 | A1* | 8/2008 | Fujii | G06T 15/503 |
| | | | | 345/419 |
| 2009/0128549 | A1* | 5/2009 | Gloudemans | G06T 15/20 |
| | | | | 345/419 |
| 2010/0214400 | A1* | 8/2010 | Shimizu | G06F 3/0346 |
| | | | | 348/77 |
| 2011/0254958 | A1* | 10/2011 | Kotani | G06T 15/205 |
| | | | | 348/159 |
| 2016/0240002 | A1* | 8/2016 | Ogata | G06T 19/00 |
| 2017/0116787 | A1* | 4/2017 | Park | G06F 3/12 |
| 2017/0278166 | A1* | 9/2017 | Jeong | G06Q 30/0623 |
| 2018/0063499 | A1* | 3/2018 | Koizumi | H04N 9/045 |
| 2018/0096520 | A1* | 4/2018 | Yoshimura | G06T 15/205 |
| 2019/0268612 | A1* | 8/2019 | Fukuyasu | H04N 19/30 |

* cited by examiner

FIG. 6 ated from the collected images, and by performing processing such as rendering. The generated virtual viewpoint content is sent to a user terminal, and browsed by the user.

IMAGE GENERATION APPARATUS AND METHOD OF GENERATING VIRTUAL VIEW-POINT IMAGE

BACKGROUND OF THE INVENTION

Field of the Invention

The present invention relates to a technique of generating a virtual viewpoint image by using images captured with a plurality of cameras.

Description of the Related Art

Recently, a technique in which a plurality of cameras is installed at different locations to synchronously capture images from multiple viewpoints, and to generate a virtual viewpoint content by using a plurality of images (a plurality of viewpoint images) obtained by the capturing, has been attracting attention. Such a technique of generating a virtual viewpoint content allows for, for example, viewing the highlights scene of football or basketball from various angles, and as such can provide the user with a higher sense of presence in comparison with typical images.

Virtual viewpoint content based on a plurality of viewpoint images is generated by collecting images captured with a plurality of cameras in an image generation apparatus such as a server to generate a three-dimensional model from the collected images, and by performing processing such as rendering. The generated virtual viewpoint content is sent to a user terminal, and browsed by the user.

A shape estimation method called Visual Hull is known as a three-dimensional model generating method used by an image generation apparatus. A three-dimensional model generated by Visual Hull or the like is expressed by points in a space and/or a group of voxels. To provide color information to the points and/or the voxels, a coloring process is performed on each point and/or voxel by using images captured with a plurality of cameras.

Japanese Patent Laid-Open No. 2011-228845 (hereinafter referred to as Patent literature 1) discloses that, in a case that a virtual viewpoint image is generated from images captured with a plurality of cameras, selecting a camera whose image is used, and re-selecting a camera for each frame of the virtual viewpoint image to perform a coloring process. According to Patent literature 1, an image of the camera can be appropriately selected for each frame, and a virtual viewpoint image having a relatively high quality with a less color difference between frames can be generated.

In the case that a three-dimensional model is generated from a plurality of captured images, the accuracy of the shape of the three-dimensional model to be generated might differ depending on the state of the subject during the capturing and the like. In Visual Hull for example, it is difficult to accurately create a three-dimensional model of a subject having a recessed shape, and the shape corresponding to the actual state of the subject might not be properly estimated. In a case that a coloring process is performed on a three-dimensional model by a method of the related art and that the accuracy of the shape estimation of the three-dimensional model is low, the quality of the virtual viewpoint image to be generated might be reduced, and the image might be damaged.

SUMMARY OF THE INVENTION

According to one aspect of the present invention, there is provided an image generation apparatus configured to generate a virtual viewpoint image, the image generation apparatus comprising: an obtaining unit configured to obtain shape data indicating a three-dimensional shape of an object captured from a plurality of directions by a plurality of cameras; a selecting unit configured to select, based on a result of an evaluation on the shape data obtained by the obtaining unit, a method of determining a pixel value in the virtual viewpoint image from among a plurality of methods; and a generating unit configured to generate a virtual viewpoint image by the method of determining the pixel value selected by the selecting unit, wherein the virtual viewpoint image is based on images obtained based on capturing by the plurality of cameras, the shape data obtained by the obtaining unit, and viewpoint information representing a virtual viewpoint.

According to another aspect of the present invention, there is provided a method of generating a virtual viewpoint image, the method comprising: obtaining shape data indicating a three-dimensional shape of an object captured from a plurality of directions by a plurality of cameras; selecting, based on a result of an evaluation on the shape data obtained by the obtaining unit, a method of determining a pixel value in the virtual viewpoint image from among a plurality of methods; and generating a virtual viewpoint image by the selected method of determining the pixel value, wherein the virtual viewpoint image is based on images obtained based on capturing by the plurality of cameras, the obtained shape data, and viewpoint information representing a virtual viewpoint.

According to another aspect of the present invention, there is provided a computer-readable medium storing a computer program for causing a computer to execute a method of controlling an image generation apparatus configured to generate a virtual viewpoint image, the method comprising: obtaining shape data indicating a three-dimensional shape of an object captured from a plurality of directions by a plurality of cameras; selecting, based on a result of an evaluation on the shape data obtained by the obtaining unit, a method of determining a pixel value in the virtual viewpoint image from among a plurality of methods; and generating a virtual viewpoint image by the selected method of determining the pixel value, wherein the virtual viewpoint image is based on images obtained based on capturing by the plurality of cameras, the obtained shape data, and viewpoint information representing a virtual viewpoint.

Further features of the present invention will become apparent from the following description of exemplary embodiments (with reference to the attached drawings).

DESCRIPTION OF THE EMBODIMENTS

Embodiments of the present invention are elaborated below with reference to the accompanying drawings.

First Embodiment

In the first embodiment, a process in which coloring is performed on points constituting a three-dimensional model after a captured image including an outlier is eliminated from candidates for captured images used for the coloring is described.

Figure 1:
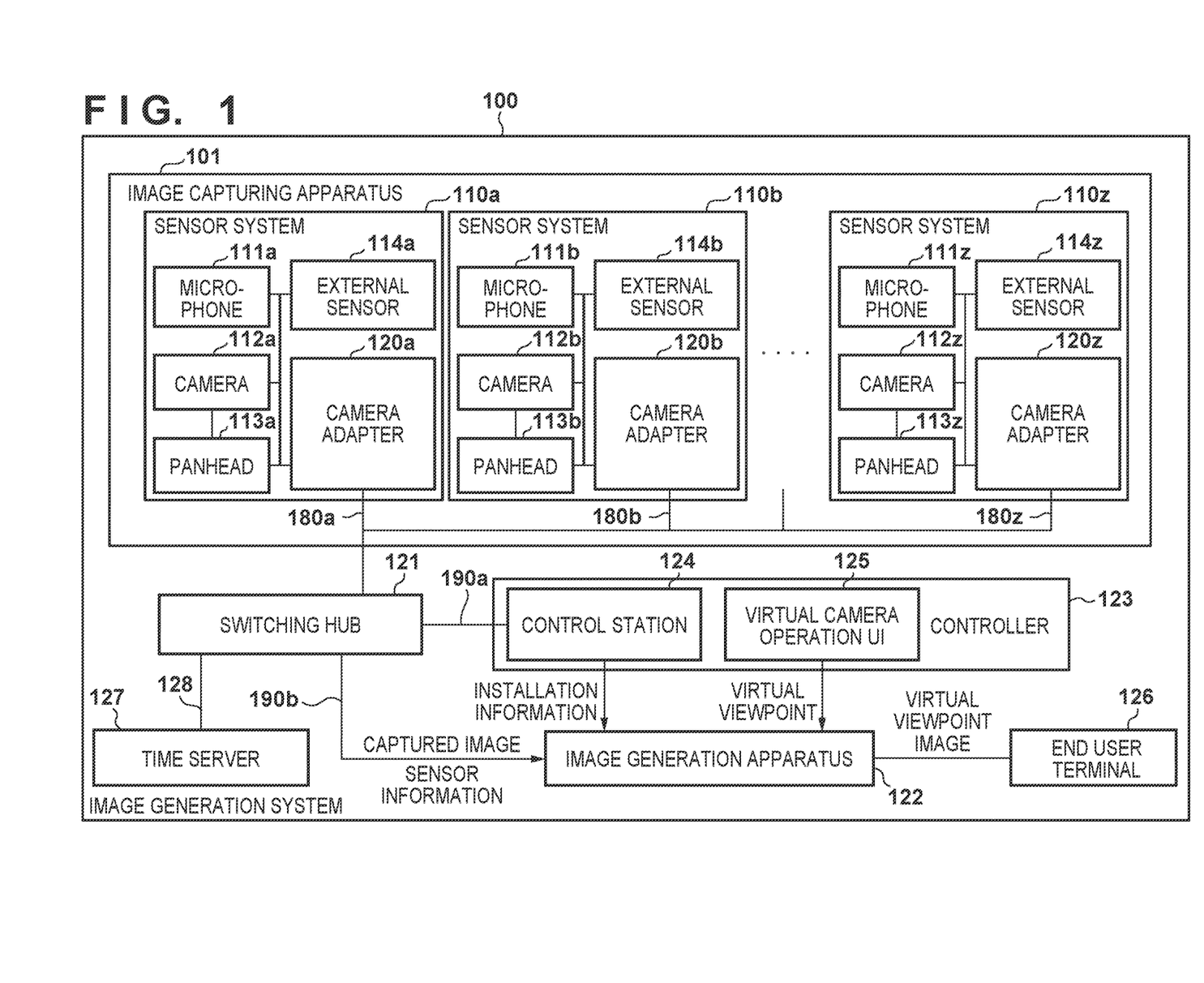
FIG. 1 is a block diagram illustrating an exemplary configuration of an image generation system according to an embodiment.

FIG. 1 is a block diagram illustrating an exemplary configuration of an image generation system according to an embodiment. Below, an image generation system of the present embodiment in which a plurality of cameras and microphones are installed in a facility such as a stadium and a concert hall, and capturing and sound collection are performed is described with reference to a system configuration diagram of FIG. 1. An image generation system 100 includes sensor systems 110a to 110z, an image generation apparatus 122, a controller 123, a switching hub 121, and an end user terminal 126.

In the sensor system 110a, a microphone 111a converts a collected sound into an electrical sound signal and outputs the electrical sound signal. A camera 112a outputs an image obtained by capturing a subject, as an electrical image signal (hereinafter referred to as captured image). A panhead 113a changes the orientation (pan, tilt) of the camera 112a. An external sensor 114a detects the temperature, vibration, and the like of the camera 112a. A camera adapter 120a outputs a sound signal obtained from the microphone 111a and a captured image obtained from the camera 112a to a network cable 180a. In addition, in accordance with a command input via the network cable 180a, the camera adapter 120a controls the panhead 113a to change the orientation of the camera 112a.

Note that the sensor system 110a is not limited to the above-mentioned configuration as long as at least one camera adapter 120a, and one camera 112a or one microphone 111a are provided. Alternatively, for example, the sensor system 110a may be configured with one camera adapter 120a and a plurality of cameras 112a, or with one camera 112a and a plurality of camera adapters 120a. That is, the plurality of cameras 112 and the plurality of camera adapters 120 in the image generation system 100 are in an N-to-M relationship (each of N and M is a non-zero positive integer). The sensor system 110a may include an apparatus other than the microphone 111a, the camera 112a, the panhead 113a, and the camera adapter 120a. The camera 112 and the camera adapter 120 may be integrated with each other.

Each of the sensor systems 110b to 110z has the configuration identical to that of the sensor system 110a. It should be noted that the present invention is not limited to the configuration in which each of the sensor systems 110b to 110z has the configuration identical to that of the sensor system 110a, and the sensor systems 110b to 110z may have different configurations. In the image generation system 100 of the present embodiment, the sensor systems 110a to 110z include the cameras 112a to 112z, respectively. Thus, the image generation system 100 includes the plurality of cameras 112a to 112z for capturing images of a subject from a plurality of directions.

The sensor systems 110a to 110z are connected with the switching hub 121 via the network cables 180a to 180z, respectively, and constitute a star-shaped network. The sensor systems 110a to 110z can exchange data with one another via the switching hub 121. The sensor systems 110a to 110z are connected with the image generation apparatus 122 via the network cables 180a to 180z, respectively, and via the switching hub 121. Accordingly, the sound collected with the microphones 111a to 111z and the images captured with the cameras 112a to 112z are transmitted to the switching hub 121 via the camera adapters 120a to 120z, and transmitted to the image generation apparatus 122.

While the camera 112a and the camera adapter 120a of the sensor system 110a are separated from each other in the present embodiment, the camera 112a and the camera adapter 120a may be integrated into one housing. In this case, the microphone 111a may be incorporated in the integrated camera 112a, or may be externally connected with the camera 112a. The same applies to the sensor systems 110b to 110z.

While the image generation system 100 of the present embodiment includes 26 sets of sensor systems, this configuration is merely an example, and the number of the sensor systems is not limited. Note that, in the following description of the present embodiment, the term "image" includes a concept of a moving image and a concept of a still picture unless otherwise noted. That is, the image generation system 100 of the present embodiment can process both still pictures and moving images. In addition, while an exemplary case that a virtual viewpoint content, provided by the image generation system 100 includes a virtual viewpoint image and a virtual viewpoint sound, is mainly described in the present embodiment, this is not limitative. For example, the virtual viewpoint content may not include a sound. Alternatively, for example, the sound included in the virtual viewpoint content may be a sound collected with a microphone closest to a virtual viewpoint. In addition, while description of the sound is partially omitted in the present embodiment for the sake of simplification of description, it is assumed that the image and the sound are basically processed together.

A time server 127 has a function of delivering a time and a synchronization signal, and delivers a time and a synchronization signal to the sensor systems 110a to 110z via the switching hub 121. The camera adapters 120a to 120z which have received a time and a synchronization signal perform image frame synchronization by genlocking the cameras 112a to 112z on the basis of the time and the synchronization signal. That is, the time server 127 synchronizes the capturing timings of the plurality of cameras 112a to 112z. In this manner, the image generation system 100 can generate a virtual viewpoint image based on a plurality of captured images captured at the same timing, and it is thus possible to suppress deterioration of the quality of the virtual viewpoint image due to variations in capturing timing. While it is assumed that the time server 127 manages the time synchronization of the cameras 112a to 112z in the present embodiment, this is not limitative, and the process of the time synchronization may be independently performed by each of the cameras 112a to 112z, or each of the camera adapters 120a to 120z.

The image generation apparatus 122 performs a process of generating a virtual viewpoint image based on data obtained from the sensor systems 110a to 110z via a network cable 190b. A virtual viewpoint image generated by the image generation apparatus 122 is transmitted to the end user terminal 126, and the user operating the end user terminal 126 can browse an image and listen a sound corresponding to designation of viewpoint. While an exemplary case that sound data (audio data) is included in the virtual viewpoint content is mainly described in the present embodiment, the sound data may not be necessarily included.

In addition, the image generation apparatus 122 can transmit a virtual viewpoint image to the end user terminal 126 by using a MPEG-DASH protocol after compressing and coding the virtual viewpoint image by standard technology typified by H.264 and HEVC. In addition, the image generation apparatus 122 can transmit an uncompressed virtual viewpoint image to the end user terminal 126. In particular, the former where compression and coding is performed is designed for a smartphone or a tablet as the end user terminal 126, and the latter is designed for a display capable of displaying an uncompressed image. That is, the image generation apparatus 122 can switch the image format in accordance with the type of the end user terminal 126. In addition, the transmission protocol of the image used by the image generation apparatus 122 is not limited to MPEG-DASH, but may be HTTP Live Streaming (HLS) or other transmission methods, for example.

The controller 123 includes a control station 124 and a virtual camera operation UI 125. The control station 124 performs a parameter setting control, management of the operation state, and the like for each block configuring the image generation system 100 via the network cables 180a to 180z and a network cable 190a. In addition, the control station 124 transmits installation information of the cameras 112a to 112z to the image generation apparatus 122. The installation information is information indicating at least one of positions, directions and orientations of each of the cameras 112a to 112z. The virtual camera operation UI 125 transmits, to the image generation apparatus 122, viewpoint information indicating at least one of the position and the direction of a designated virtual viewpoint on the basis of a user's operation and the like. The image generation apparatus 122 generates an image of the designated virtual viewpoint, and transmits the image to the end user terminal 126. Note that the installation information of the cameras and the viewpoint information of the virtual viewpoint may be transmitted to the image generation apparatus 122 via the network cables 190a and 190b, or may be transmitted via a cable directly connecting the controller 123 and the image generation apparatus 122.

Here, the network may be Gigabit Ethernet (GbE) or 10 GbE, which is Ethernet (registered trademark), in conformity with IEEE standards, or a configuration by combining interconnect Infiniband, Industrial Ethernet and the like. In addition, the network is not limited to the above-mentioned examples, and networks of other types may also be adopted.

Note that the control station 124 transmits, to the image generation apparatus 122, a three-dimensional model of a place (e.g. a stadium) as a target of generation of the virtual viewpoint image. Further, the control station 124 performs calibration when the camera is installed. Specifically, a marker is placed on the field of a capturing target, and the focal length, the position and the direction in the world coordinate of each camera are calculated with a captured image of the camera 112. Information on the calculated position, direction, focal length of each camera (camera information) is transmitted to the image generation apparatus 122. The transmitted three-dimensional model and the transmitted information of each camera are used when the image generation apparatus 122 generates a virtual viewpoint image.

Figure 2A:
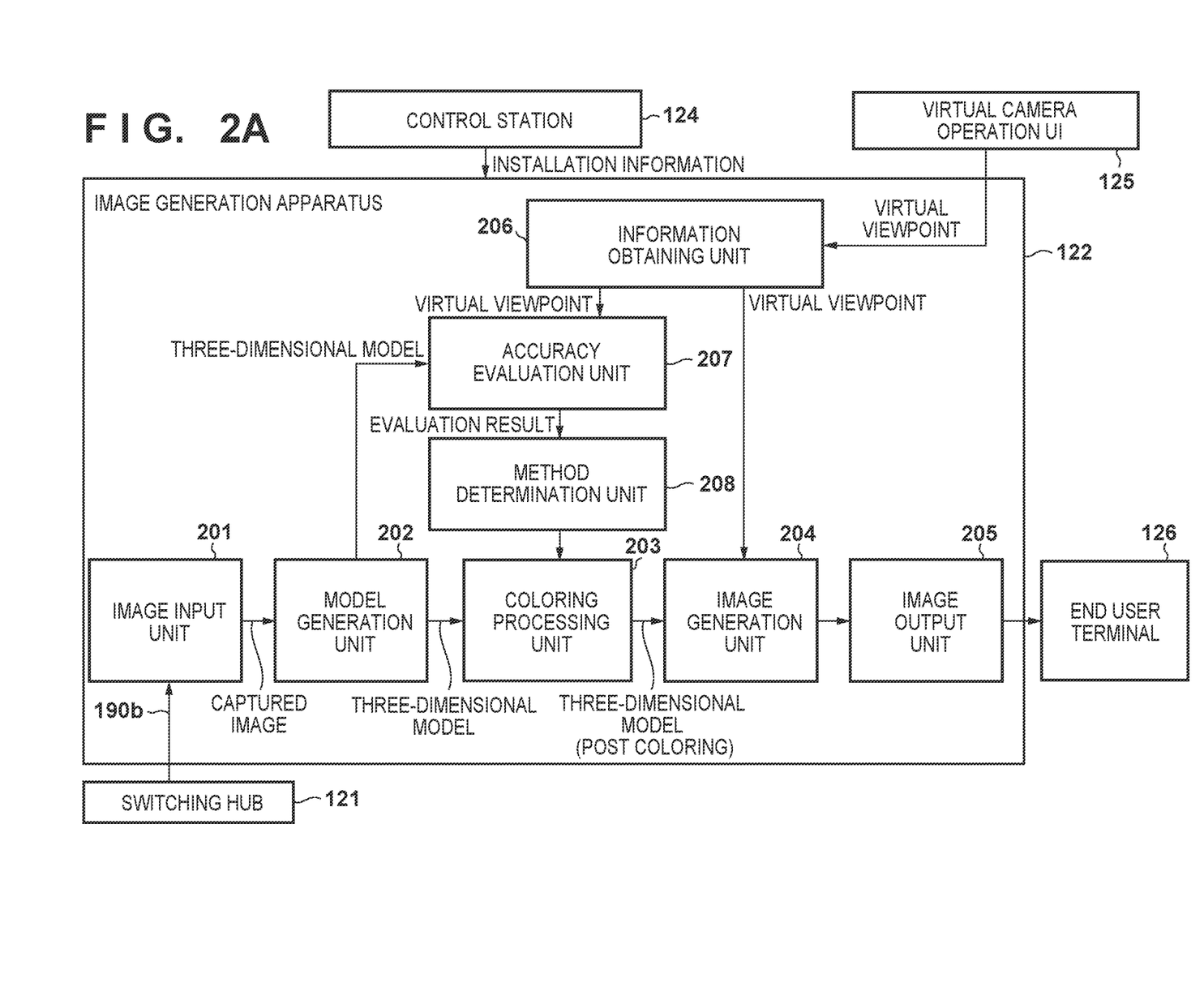
FIG. 2A is a block diagram illustrating an exemplary functional configuration of an image generation apparatus according to the embodiment.

Next, a functional configuration of the image generation apparatus 122 of the present embodiment is described. FIG. 2A is a block diagram illustrating an exemplary functional configuration of the image generation apparatus 122. A function of the image generation apparatus 122 for processing a captured image is described below.

An image input unit 201 inputs a captured image and a sound signal transmitted from the sensor systems 110a to 110z via the switching hub 121. The captured image input from the image input unit 201 is transmitted to a model generation unit 202. The model generation unit 202 generates a three-dimensional model on the basis of the captured image input from the image input unit 201 and the installation information input from the control station 124. The generation of a three-dimensional model is executed by a shape estimation method such as Visual Hull, for example. It should be noted that the generation of a three-dimensional model may be executed by other methods. In the following description of the present embodiment, the three-dimensional model is constituted by points. It should be noted that the three-dimensional model may be constituted by voxels and/or polygons. Note that the three-dimensional model is merely an example of shape data representing the three-dimensional shape of an object, and shape data of another type may also be adopted.

A coloring processing unit 203 performs a coloring process on a three-dimensional model generated by the model generation unit 202 by using a captured image. Specifically, the coloring processing unit 203 performs coloring by, for each point constituting the three-dimensional model, selecting a plurality of captured images according to the positional relationship between the point and the camera on the basis of the installation information, and obtaining an appropriate pixel value from the plurality of selected captured images. Note that the coloring processing unit 203 may perform coloring by using a partial image which is obtained by extracting a region of a specific subject from a captured image. An image generation unit 204 generates a virtual viewpoint image corresponding to the designated virtual viewpoint by using a colored three-dimensional model. The image generation unit 204 generates a virtual viewpoint image by projecting a three-dimensional model disposed in a three-dimensional space to a virtual viewpoint, for example. That is, the pixel value in the virtual viewpoint image is determined in accordance with the coloring to the three-dimensional model. It should be noted that the method of generating a virtual viewpoint image is not limited to this, and the pixel value of a virtual viewpoint image may be directly determined without performing the coloring on the three-dimensional model, for example. An image output unit 205 outputs the virtual viewpoint image generated by the image generation unit 204 to the end user terminal 126 as an image. Note that a process of converting the image format in accordance with the end user terminal 126 is performed in the image output unit 205.

An information obtaining unit 206 obtains viewpoint information of a virtual viewpoint designated by the virtual camera operation UI 125. In the image generation unit 204, a virtual viewpoint image is generated based on the viewpoint information obtained by the information obtaining unit 206. An accuracy evaluation unit 207 evaluates the accuracy of a resultant three-dimensional model generated by the model generation unit 202 (referred to as accuracy evaluation), and provides the evaluation result (accuracy information) to a method determination unit 208. The accuracy evaluation unit 207 may evaluate the accuracy of a portion which is observed from the virtual viewpoint of the three-dimensional model. The method determination unit 208 determines the coloring method for the three-dimensional model on the basis of the evaluation result (accuracy information) of the accuracy evaluation unit 207, and notifies the method to the coloring processing unit 203. The coloring processing unit 203 performs a coloring process on the three-dimensional model by using the coloring method notified from the coloring method determination unit 208. Note that the components of the image generation apparatus 122 illustrated in FIG. 2A may be separately mounted in a plurality of apparatuses. For example, the model generation unit 202 and the coloring processing unit 203 may be mounted in an apparatus which is different from an apparatus in which the image generation unit 204 is mounted.

Figure 2B:
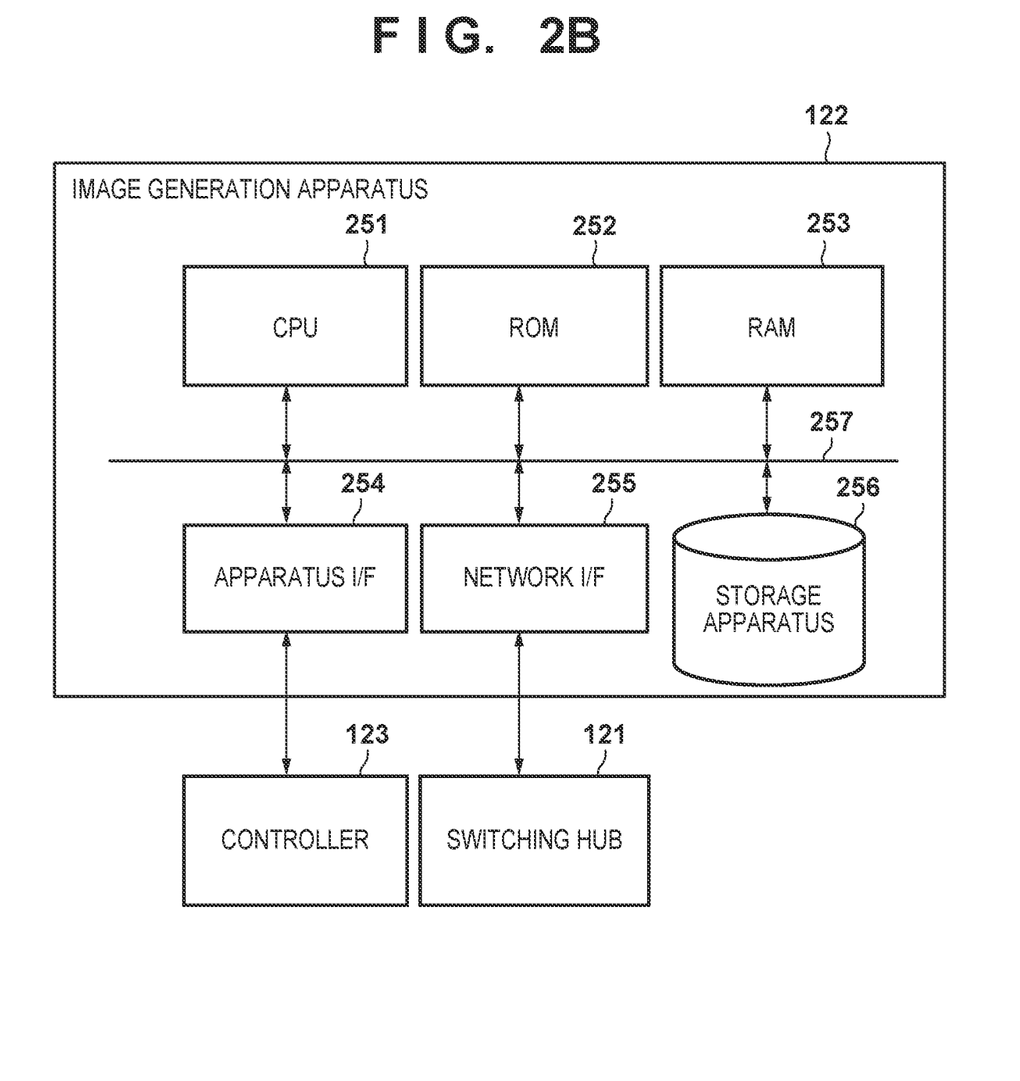
FIG. 2B is a block diagram illustrating an exemplary hardware configuration of the image generation apparatus.

FIG. 2B is a block diagram illustrating an exemplary hardware configuration of the image generation apparatus 122. In FIG. 2B, a CPU 251 executes a program stored in a ROM 252 or a RAM 253 to achieve various controls including a process described later. The ROM 252 is a nonvolatile read-only memory. The RAM 253 is a memory that can be read from and written to as necessary, and provides an area for developing a program stored in a storage apparatus 256 and a work area of the CPU 251. An apparatus I/F 254 is an interface for establishing connection with the controller 123. A network I/F 255 is an interface for establishing connection with a network (specifically, the switching hub 121) configured by the image generation system. The storage apparatus 256 stores a program to be executed by the CPU 251, a captured image, a generated three-dimensional model, a sound signal and the like. Each functional unit illustrated in FIG. 2A may be achieved by executing a predetermined program with the CPU 251, or some or all of the each functional unit may be achieved by dedicated hardware.

Figure 3:
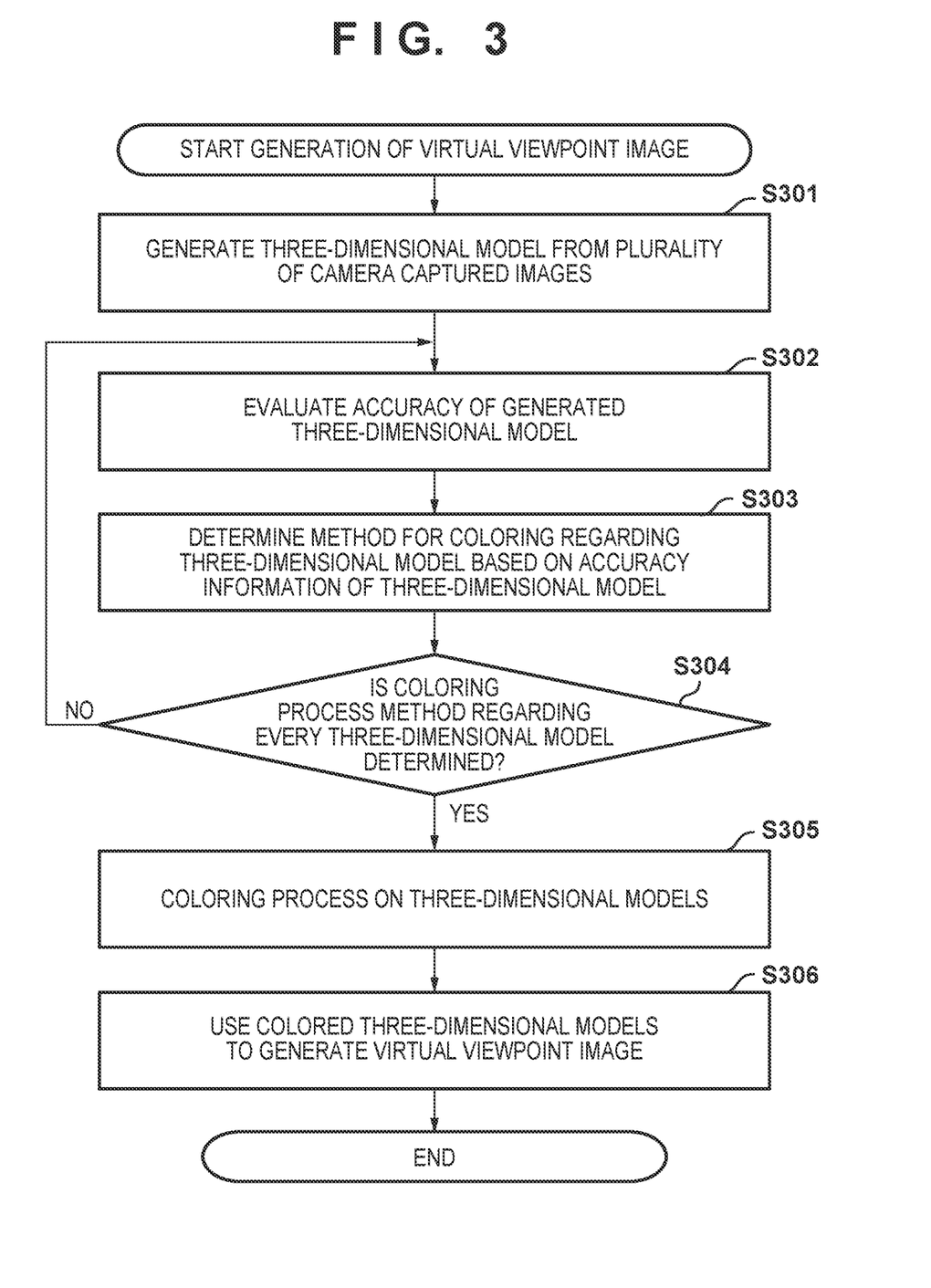
FIG. 3 is a flowchart of a process of generating a virtual viewpoint image with the image generation apparatus.

Next, an operation of the image generation apparatus 122 in the image generation system 100 including the above-mentioned configuration is described. FIG. 3 is a flowchart illustrating a process of generating a virtual viewpoint image with the image generation apparatus 122. The flowchart of FIG. 3 illustrates a flow of a process of generating one frame of a virtual viewpoint image. In the present embodiment, failure of a virtual viewpoint image is reduced or prevented by evaluating the correspondence between the shape of the subject and the shape of the three-dimensional model of the subject generated from a plurality of captured images, and by selecting the coloring method used for performing coloring of the three-dimensional model on the basis of the result of the evaluation.

At step S301, the model generation unit 202 generates a three-dimensional model on the basis of captured images captured by a plurality of cameras among the cameras 112a to 112z and installation information obtained from the control station 124. Next, at step S302, the accuracy evaluation unit 207 evaluates the accuracy of the resultant three-dimensional model generated at step S301, and generates accuracy information on the basis of the evaluation result. This accuracy evaluation is an example of the above-mentioned evaluation on the correspondence between the shape of the subject and the shape of the three-dimensional model. Details of the evaluation method is described later. At step S303, the method determination unit 208 determines the coloring method used for the coloring process for the three-dimensional model generated at step S301 on the basis of the accuracy information of the three-dimensional model output at step S302. The processes of step S302 and step S303 are performed on all of the generated three-dimensional models (step S304).

At step S304, when it is determined that the accuracy evaluation and the determination of the method of the coloring process have been performed for all of the three-dimensional models, the coloring processing unit 203 performs coloring of the three-dimensional models in accordance with the determined coloring method at step S305. Thereafter, at step S306, the image generation unit 204 generates a virtual viewpoint image by using the three-dimensional models on which the coloring process has been performed.

Figure 4A:
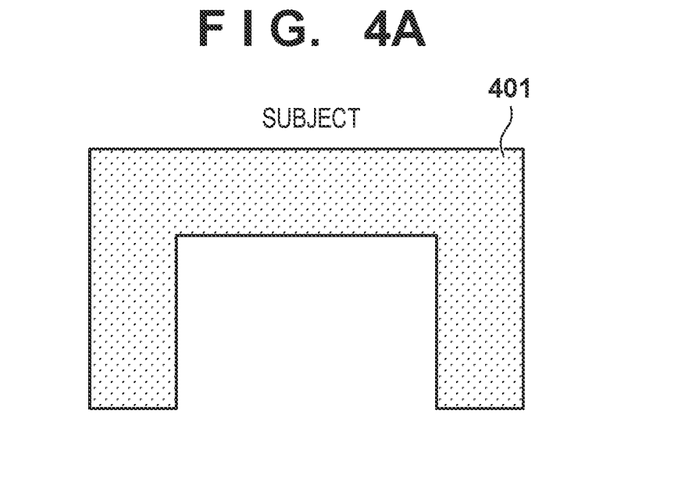
FIGS. 4A and 4B are diagrams for describing a generation state of a three-dimensional model of a subject including a recess.
Figure 4B:
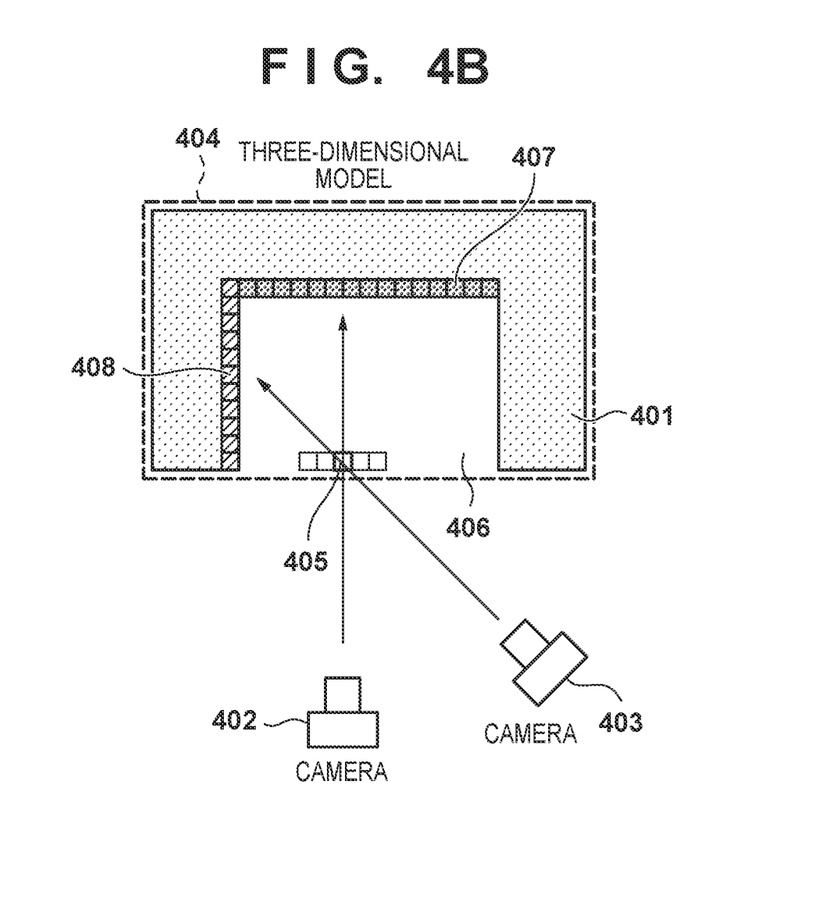

Next, an exemplary case that the three-dimensional model cannot be generated with high accuracy is described. FIGS. 4A and 4B are diagrams for describing a subject as a generation target of a three-dimensional model and a generated three-dimensional model. FIG. 4A illustrates a subject 401 as viewed from above, and the subject 401 has a concave part as illustrated in FIG. 4A. The shape indicated by the dotted line in FIG. 4B is a three-dimensional model 404 generated for the subject 401, which is a result of shape estimation performed by the model generation unit 202 by using captured images captured with a camera 402 and a camera 403. While FIG. 4B illustrates two cameras, shape estimation is performed by using captured images obtained by arbitrary numbers of cameras in practice. In shape estimation by Visual Hull, it is difficult to estimate the shape of a concave part, and consequently a three-dimensional model in which a concave portion 406 is filled might be generated as the three-dimensional model 404 indicates.

Additionally, a problem with the coloring process of the above-mentioned three-dimensional model 404 is described. A point 405 is a point constituting the three-dimensional model 404, and is an unreal point left in the concave portion 406. When a coloring process is performed on a point constituting the three-dimensional model 404, the coloring is performed by, for example, averaging the color values obtained from captured images obtained by each of the camera 402 and the camera 403. The point 405 of the three-dimensional model 404 does not exist in the subject 401, and therefore, coloring is performed on a wrong position if the coloring is performed on the point 405.

In the example illustrated in FIG. 4B, the color corresponding to the point 405 in the captured image obtained from the camera 402 is the color of a portion 407 adjacent to the concave portion 406 of the subject 401. In addition, the color corresponding to the point 405 in the captured image obtained from the camera 403 is the color of a portion 408 adjacent to the concave portion 406 of the subject 401. Consequently, the coloring process is performed by referring to the colors of different portions of the subject from each of the captured images of the camera 402 and the camera 403, and the color for coloring the point 405 might be significantly different from the actual color. As a result, wrong coloring is performed at wrong positions, and the quality of the image might be deteriorated.

Figure 5A:
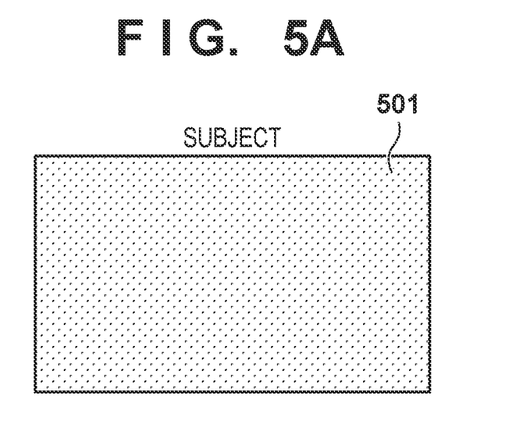
FIGS. 5A and 5B are diagrams for describing a method of an accuracy evaluation on a three-dimensional model according to the embodiment.
Figure 5B:
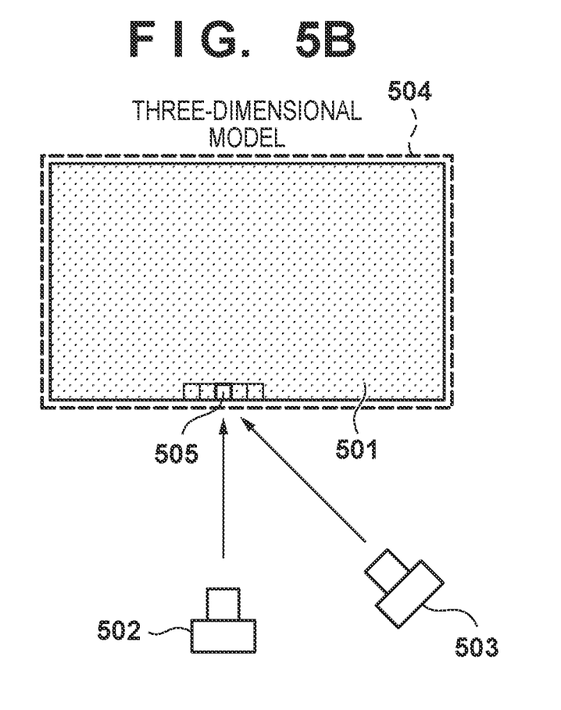

Next, an accuracy evaluation method for a three-dimensional model is described with reference to FIGS. 5A and 5B. FIGS. 5A and 5B illustrate a subject and a three-dimensional model as viewed from above as in FIGS. 4A and 4B. A subject 501 illustrated in FIG. 5A does not include the concave portion 406 unlike the subject 401, and a highly accurate three-dimensional model can be generated.

In FIG. 5B, a three-dimensional model 504 generated by shape estimation of the subject 501 is indicated with the dotted line. Here, a point 505 constituting the three-dimensional model 504 is captured with a camera 502 and a camera 503. In the three-dimensional model 504, the shape of the subject 501 does not include a recess or the like, and therefore the shape of the subject 501 is accurately estimated. Accordingly, the point 505 of the three-dimensional model 504 corresponds to an actual point on the subject 501, and the value (color) of the position corresponding to the point 505 in the captured image of the camera 502 and the captured image of camera 503 is close to the color of the actual point.

On the other hand, as described above with reference to FIGS. 4A and 4B, a difference between the shape of the subject and the shape of the three-dimensional model, which is a result of estimation of the subject, results in a difference between the values (colors) of a position corresponding the same single point constituting the three-dimensional model in the plurality of captured images. For example, in a case that the shape of the subject 401 including the concave portion 406 is estimated, the three-dimensional model 404 in which the concave portion 406 is filled might be obtained as described above. In this case, the colors of the captured images of the camera 402 and the camera 403 corresponding to the point 405, which is a wrong point (a point which is not exist in the subject) constituting the three-dimensional model 404, are the colors obtained by capturing the portion 407 and the portion 408, respectively, thus resulting in a difference between the colors. From the above, it is understood that the accuracy evaluation on a three-dimensional model can be performed on the basis of the colors of the position corresponding to the same single point constituting the three-dimensional model in a plurality of captured images.

For example, the accuracy of a three-dimensional model can be evaluated on the basis of a difference between the colors, obtained from a plurality of captured images, of a position corresponding to the same single point. Specifically, as described above, in a case that the accuracy of generation of a three-dimensional model is low, a difference arises between the colors of a position corresponding to a point constituting the three-dimensional model in the captured images of a plurality of cameras capturing the point. Accordingly, in a case that a difference between the colors obtained from captured images of a plurality of cameras is calculated for each point constituting a three-dimensional model, and the ratio of the number of points where the calculated difference is equal to or greater than a predetermined value to the total number of points constituting the three-dimensional model is large, the accuracy of generation of the three-dimensional model can be determined to be low. The above-mentioned predetermined value may be determined based on a user's operation on the image generation apparatus 122, or may be automatically set, for example. Note that, in place of the total number of points constituting a three-dimensional model, the number of points constituting the three-dimensional model in the range which is observed from the virtual viewpoint may be used. In addition, for a color difference regarding a point constituting the three-dimensional model, a value obtained from a combination of captured images having a largest color difference may also be adopted. Alternatively, the color difference may be calculated using captured images obtained from two cameras having a largest difference between the orientations of the straight lines extending from respective cameras to the point. Further, a value calculated using pixel values of three or more captured images may also be used as the color difference.

Figure 6:
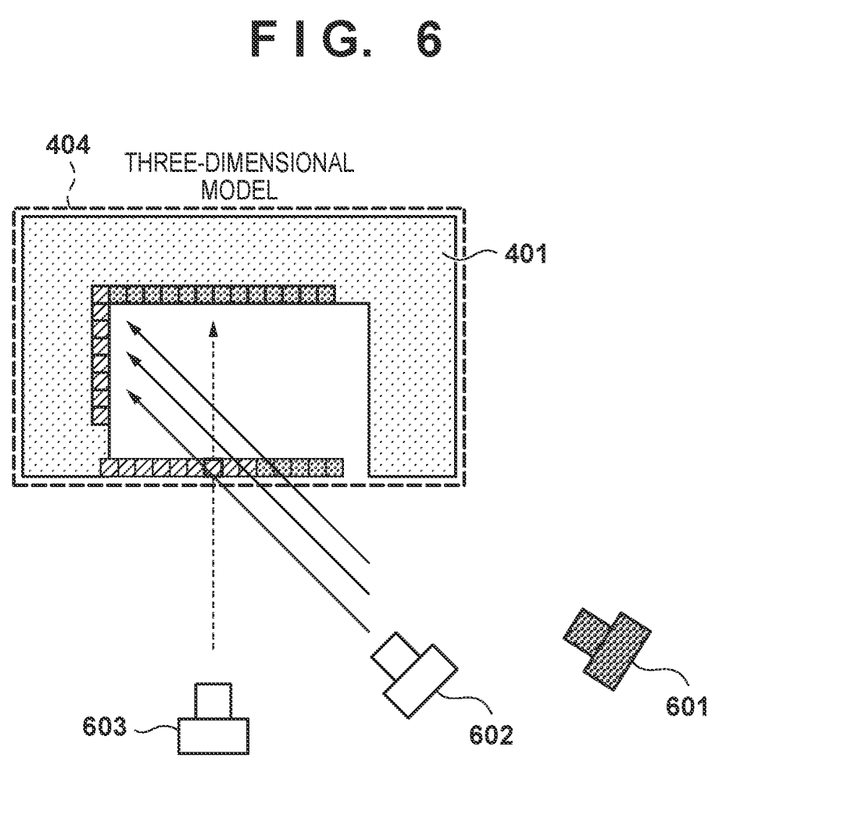
FIG. 6 is a diagram for describing a method of coloring a three-dimensional model according to the embodiment.

The coloring process on a three-dimensional model in the first embodiment is described with reference to the drawings. FIG. 6 illustrates a method of a coloring process in a case that the accuracy of a generated three-dimensional model is low as illustrated in FIG. 4B. The process described with reference to FIG. 6 is performed at step S305 (FIG. 3). In the present embodiment, as an exemplary switching of the method of the coloring process, the coloring process is switched such that, in a case that the evaluated accuracy of a three-dimensional model does not achieve a predetermined reference level, the coloring of the three-dimensional model is performed using a captured image of a single camera.

In FIG. 6, a virtual camera 601 represents a virtual viewpoint designated by the virtual camera operation UI 125 for generating a virtual viewpoint image. A camera 602 and a camera 603 provide captured images which are used for coloring in a case that the accuracy of the three-dimensional model is determined to be high. In the case that the accuracy of the three-dimensional model is high, a high-quality virtual viewpoint image having a color closer to the actual color can be generated by performing coloring of the three-dimensional model by using a plurality of captured images of a plurality of cameras when there is no camera that captures an image from a viewpoint identical to the virtual viewpoint. For example, a pixel corresponding to the same single point of the three-dimensional model may be extracted from each of captured images of a plurality of cameras located near the virtual viewpoint to use, for coloring of the same single point, a value obtained by averaging the pixel values of the extracted pixels. On the other hand, as illustrated in FIGS. 4A and 4B, in the case that the accuracy of generation of a three-dimensional model is low, if coloring is performed by, for example, averaging the pixel values of a plurality of captured images captured with a plurality of cameras as in the case that the accuracy is high, wrong coloring might be performed on a mistakenly generated point of the three-dimensional model. In view of this, in the case that the accuracy of the three-dimensional model is determined to be low, a process of limiting the captured image used for coloring to be one captured image is performed. In FIG. 6, the coloring process is performed using only the captured image of the camera 602 located near the virtual camera 601. Such a process reduces the possibility of coloring with a color significantly different from the color which is actually viewed from a viewpoint corresponding to the virtual viewpoint although the coloring is performed on an unreal point. As a result, even in the case that the accuracy of the three-dimensional model is low, the possibility of failure of images can be reduced.

While the coloring process performed for the three-dimensional model is switched in accordance with the evaluation on the three-dimensional model in the present embodiment, this is not limitative. Since the accuracy of each of the points constituting the three-dimensional model can be evaluated by calculating the color difference for each point, the coloring method may be selected and switched for each point constituting the three-dimensional model. It should be noted that, with the method in which the coloring method is determined for each three-dimensional model, the possibility of impairment of the continuity of the color of an area corresponding to a single subject (e.g. a ball or a player) in the generated virtual viewpoint image can be reduced.

As described above, in the method according to the first embodiment, the accuracy evaluation is performed on a point constituting a generated three-dimensional model by using a color difference obtained from captured images of a plurality of cameras, and the method of coloring the three-dimensional model is determined based on the evaluation result. With such a process, a coloring method which suppresses deterioration of the image quality of the generated virtual viewpoint image and failure of the image can be selected even in the case where the accuracy of the three-dimensional model is low, and a coloring method capable of generating a virtual viewpoint image having higher image quality can be selected in the case that the accuracy of the three-dimensional model is high. While the case that the accuracy of the three-dimensional model is evaluated is mainly described in the present embodiment, the image generation apparatus 122 may not perform the evaluation on the accuracy of the three-dimensional model. For example, the image generation apparatus 122 may use a captured image of a single camera as the image used for the coloring process to be performed on the target model in the case that the difference between corresponding pixel values in a plurality of captured images of a plurality of cameras is greater than a predetermined threshold value, and may perform the coloring process by using a plurality of captured images of a plurality of cameras in a case that the difference is not greater than a predetermined threshold value. With this configuration, generation of irregularity in the generated virtual viewpoint image can be suppressed. In addition, while the method of coloring the three-dimensional model is switched is described in the present embodiment, this is not limitative as long as a process for generating a virtual viewpoint image is switched. For example, the above-mentioned coloring process may be performed on the three-dimensional model in a case that the accuracy of the three-dimensional model is determined to be high, and a virtual viewpoint image may be generated by using, for example, projection conversion of the captured image without using the three-dimensional model in a case that the accuracy of the three-dimensional model is determined to be low.

Second Embodiment

In the first embodiment, explanation was given for an example in which, to evaluate the correspondence between the shape of a subject and the shape of a three-dimensional model of the subject generated from a plurality of captured images, the accuracy evaluation is performed on the basis of a color difference at a point on the three-dimensional model obtained from a plurality of captured images. In the second embodiment, the shape of the subject is estimated by performing a distance estimation by using a plurality of cameras, and the accuracy of the three-dimensional model is evaluated on the basis of the estimated shape. Note that the configuration of the image generation system 100 and the configuration and operation of the image generation apparatus 122 of the second embodiment are identical to those of the first embodiment (FIG. 1 to FIG. 3). It should be noted that the second embodiment is different from the first embodiment in a method of evaluating the accuracy of the three-dimensional model of the accuracy evaluation unit 207.

Now the method of evaluating the accuracy of the three-dimensional model of the second embodiment is described. As described with reference to FIG. 4B, in shape estimation using Visual Hull, the accuracy of a three-dimensional model of a subject including a recess tends to be low. In view of this, whether the subject includes a recess is determined, and if the subject includes a recess, then the accuracy of the three-dimensional model to be generated can be determined to be low.

The determination whether the subject includes a recess can be achieved by performing a distance estimation using a plurality of cameras which capture the subject. For example, the accuracy evaluation unit 207 estimates the shape of a subject by estimating the distances between each portion of the subject and cameras by a stereo matching method using two cameras. When determining that the estimated shape of the subject includes a range of concavo-convex greater than a predetermined reference level, the accuracy evaluation unit 207 evaluates that the accuracy of the three-dimensional model to be generated for the subject is low. In the case that the accuracy evaluation unit 207 evaluates that the accuracy of the three-dimensional model to be generated is low, the coloring method determination unit 208 performs switching to the coloring using a single camera as in the first embodiment.

As described above, in the second embodiment, the accuracy of generation of a three-dimensional model is evaluated by performing a distance estimation with a plurality of cameras to estimate the shape of the subject, and by determining whether the estimated shape includes a range of concavo-convex greater than a predetermined reference level. Note that the concavo-convex greater than a predetermined reference level is a concave part having a depth of a predetermined length or greater with an opening including a predetermined planar area or smaller, for example. By changing the coloring method on the basis of the evaluation result, failure of the image can be prevented or reduced. According to the embodiments, for example, even in the case that a three-dimensional model having a shape different from the actual subject is generated by the shape estimation, performing a wrong coloring process can be limited.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-238921, filed Dec. 13, 2017, which is hereby incorporated by reference herein in its entirety.

What is claimed is:

1. An image generation apparatus configured to generate a virtual viewpoint image, the image generation apparatus comprising:
one or more hardware processors; and
one or more memories which store instructions executable by the one or more hardware processors to cause the image generation apparatus to perform at least:
obtaining shape data indicating a three-dimensional shape of an object captured from a plurality of directions by a plurality of image capturing apparatuses;
selecting, based on a result of an evaluation on the obtained shape data, a method of determining a pixel value of the virtual viewpoint image from among a plurality of methods; and
generating the virtual viewpoint image by the selected method of determining the pixel value,
wherein the virtual viewpoint image is generated based on images obtained based on capturing by the plurality of image capturing apparatuses, the obtained shape data, and viewpoint information representing a virtual viewpoint corresponding to the virtual viewpoint image.

2. The image generation apparatus according to claim 1, wherein
the shape data is obtained based on a plurality of captured images obtained by the plurality of image capturing apparatuses.

3. The image generation apparatus according to claim 1, wherein the instructions further cause the image generation apparatus to perform:
evaluating the obtained shape data, and
wherein the method of determining the pixel value is selected based on a result of the evaluating of the shape data.

4. The image generation apparatus according to claim 3, wherein
the shape data is evaluated based on a plurality of pixel values in a plurality of captured images obtained by the plurality of image capturing apparatuses, the plurality of pixel values corresponding to a specific position on a three-dimensional model of the object indicated by the shape data.

5. The image generation apparatus according to claim 4, wherein
the shape data is evaluated based on a difference in the plurality of pixel values.

6. The image generation apparatus according to claim 5, wherein
the shape data is evaluated based on a proportion of a number of points, among a plurality of points constituting the three-dimensional model, having the difference in the pixel values being equal to or greater than a predetermined value.

7. The image generation apparatus according to claim 5, wherein
the shape data is evaluated based on a difference between pixel values of two captured images obtained by two image capturing apparatuses having a largest difference between orientations of straight lines extending from the image capturing apparatuses to the specific position.

8. The image generation apparatus according to claim 3, wherein
the shape data is evaluated based on whether a shape of the object includes a concave part.

9. The image generation apparatus according to claim 8, wherein
the evaluating includes determining whether the shape of the object includes the concave part based on a result of estimation of a distance between a position on the object and a position of an image capturing apparatus.

10. The image generation apparatus according to claim 1, wherein
a number of images used for determining a value of one pixel included in the virtual viewpoint image differs depending on the selected method of determining the pixel value.

11. The image generation apparatus according to claim 1, wherein
a first method for determining a value of one pixel included in the virtual viewpoint image by using an image based on capturing with one image capturing apparatus is selected in a case that an accuracy of the shape data is evaluated to be lower than a threshold value, and a second method for determining the value of the one pixel by using images based on capturing with two or more image capturing apparatuses is selected in a case that the accuracy of the shape data is evaluated to be equal to or higher than the threshold value.

12. The image generation apparatus according to claim 11, wherein
the generating includes determining the value of the one pixel by using an image based on capturing with an image capturing apparatus closest to the virtual viewpoint represented by the viewpoint information among the plurality of image capturing apparatuses in a case that the first method is selected.

13. The image generation apparatus according to claim 1, wherein
one determination method is selected for one object included in the virtual viewpoint image.

14. The image generation apparatus according to claim 1, wherein
the method of determining the pixel value is selected for each of a plurality of pixels corresponding to the object included in the virtual viewpoint image.

15. The image generation apparatus according to claim 1, wherein
the shape data is represented by a plurality of points or polygons.

16. The image generation apparatus according to claim 1, wherein
as the method of determining the pixel value of the virtual viewpoint image, a method of coloring a three-dimensional model indicated by the shape data is selected from among the plurality of methods.

17. A method of generating a virtual viewpoint image, the method comprising:
obtaining shape data indicating a three-dimensional shape of an object captured from a plurality of directions by a plurality of image capturing apparatuses;

selecting, based on a result of an evaluation on the obtained shape data, a method of determining a pixel value of the virtual viewpoint image from among a plurality of methods; and generating the virtual viewpoint image by the selected method of determining the pixel value, wherein the virtual viewpoint image is generated based on images obtained based on capturing by the plurality of image capturing apparatuses, the obtained shape data, and viewpoint information representing a virtual viewpoint corresponding to the virtual viewpoint image.

18. The method according to claim 17, wherein a number of images used for determining a value of one pixel included in the virtual viewpoint image differs depending on the selected method of determining the pixel value.

19. The method according to claim 17, wherein a first method for determining a value of one pixel included in the virtual viewpoint image by using an image based on capturing with one image capturing apparatus is selected in a case that an accuracy of the shape data is evaluated to be lower than a threshold value, and a second method for determining the value of the one pixel by using images based on capturing with two or more image capturing apparatuses is selected in a case that the accuracy of the shape data is evaluated to be equal to or higher than the threshold value.

20. A non-transitory computer-readable storage medium storing a computer program for causing a computer to execute a method of generating a virtual viewpoint image, the method comprising:

obtaining shape data indicating a three-dimensional shape of an object captured from a plurality of directions by a plurality of image capturing apparatuses;

selecting, based on a result of an evaluation on the obtained shape data, a method of determining a pixel value of the virtual viewpoint image from among a plurality of methods; and generating the virtual viewpoint image by the selected method of determining the pixel value, wherein the virtual viewpoint image is generated based on images obtained based on capturing by the plurality of image capturing apparatuses, the obtained shape data, and viewpoint information representing a virtual viewpoint corresponding to the virtual viewpoint image.

* * * * *